(12) United States Patent
Siau et al.

(10) Patent No.: US 11,165,906 B1
(45) Date of Patent: Nov. 2, 2021

(54) PRIOR CALLER LOCATION AND IDENTITY AS INPUT INTO A PUBLIC-SAFETY ANSWERING POINT (PSAP)

(71) Applicant: MOTOROLA SOLUTIONS, INC., Chicago, IL (US)

(72) Inventors: Carmen Jia Yi Siau, Kota Kinabalu (MY); Brian J Frommelt, Deer Park, IL (US); Bing Qin Lim, Jelutong (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 17/110,910

(22) Filed: Dec. 3, 2020

(51) Int. Cl.
| | |
|---|---|
| *H04M 3/51* | (2006.01) |
| *H04W 4/90* | (2018.01) |
| *G06F 3/16* | (2006.01) |
| *G10L 15/26* | (2006.01) |
| *H04M 3/58* | (2006.01) |

(52) U.S. Cl.
CPC .......... *H04M 3/5116* (2013.01); *G06F 3/167* (2013.01); *G10L 15/26* (2013.01); *H04M 3/58* (2013.01); *H04W 4/90* (2018.02); *H04M 2242/04* (2013.01)

(58) Field of Classification Search
CPC ...... G06F 3/167; G10L 15/26; H04M 3/5116; H04M 3/58; H04M 2242/04; H04W 4/90
USPC ...... 379/37–52; 370/351–357; 709/201–207, 709/217–248
See application file for complete search history.

(56) References Cited

U.S. PATENT DOCUMENTS

| | | | |
|---|---|---|---|
| 6,778,818 B1 * | 8/2004 | O'Neil ................ | H04W 4/90 |
| | | | 455/404.1 |
| 8,165,560 B2 * | 4/2012 | Stenquist ............ | H04M 11/04 |
| | | | 455/404.1 |
| 8,488,760 B2 | 7/2013 | Abramson et al. | |
| 9,420,099 B1 | 8/2016 | Krishnan et al. | |
| 9,509,838 B2 | 11/2016 | Leeds et al. | |
| 10,033,862 B2 * | 7/2018 | Yoakum ............... | H04M 3/5116 |
| 10,348,888 B1 | 7/2019 | Arnold et al. | |
| 10,419,312 B2 | 9/2019 | Alazraki et al. | |
| 10,701,542 B2 | 6/2020 | Martin et al. | |
| 2012/0066139 A1 | 3/2012 | Guzman et al. | |
| 2014/0044017 A1 | 2/2014 | Haltom | |
| 2015/0047042 A1 | 2/2015 | Haikney et al. | |
| 2016/0300227 A1 | 10/2016 | Subhedar et al. | |

OTHER PUBLICATIONS

Moradzadeh, Gelayol et al.: "Device, System and Method for Role Based Data Collection and Public-Safety Incident Response", U.S. Appl. No. 16/684,635, filed Nov. 15, 2019, all pages.
Smetek, Mateusz et al.: "Device, System and Method for Selecting Calls for Forwarding to a Communication Device", PCT application No. PCT/PL2019/050046 filed Aug. 16, 2019, all pages.

* cited by examiner

Primary Examiner — Hemant S Patel

(57) ABSTRACT

A method and apparatus for providing prior-caller location and/or identity into a public-safety answering point is provided herein. During operation, a device such as a smart phone will store location and identity information for recently-received calls. If the device places a call to a PSAP within a predetermined amount of time from when the prior call was received at the device, a flag is sent to the PSAP operator notifying the PSAP operator of the prior call. The PSAP operator can then inquire about the prior call. The caller is then allowed to electronically transfer location and identity information related to the prior call to the PSAP operator if they wish to do so.

11 Claims, 4 Drawing Sheets

PRIOR CALLER LOCATION AND IDENTITY AS INPUT INTO A PUBLIC-SAFETY ANSWERING POINT (PSAP)

BACKGROUND OF THE INVENTION

During an emergency, many people call a loved one instead of a public-safety answering point (e.g., e911, 911, 112). For example, during a school shooting, the first thought that comes into many student's minds is to get in contact with their loved ones. This results in many emergency calls being placed by the student's loved one after receiving the call from the student.

Emergency calls being placed by a person not involved in the emergency often causes confusion and error since the emergency is often located in another jurisdiction than the person placing the emergency call. In other words, the person having the emergency and the person calling 9-1-1 on their behalf are not in the same jurisdiction. Therefore, a need exists for a method and apparatus for improving an emergency PSAP operator's situational awareness when a person places an emergency call for another individual.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

Figure 1:
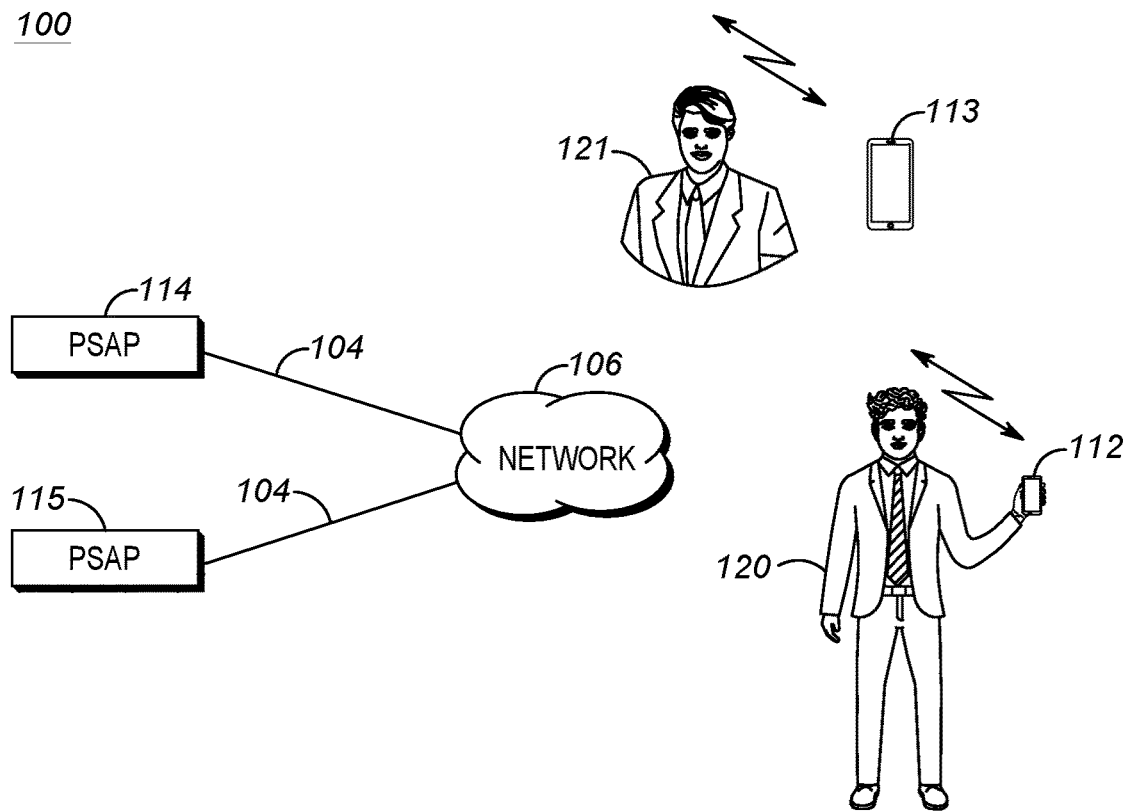
FIG. 1 shows an operational environment for the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION

In order to address the above-mentioned need, a method and apparatus for providing a prior-caller location and/or identity into a public-safety answering point is provided herein. During operation, a device such as a smart phone will store location and identity information for recently-received calls. (Alternatively, the device (or app on the device) sends this data to a cloud service that acts as the conduit for sharing the data with the PSAPs). If the device places a call to a PSAP within a predetermined amount of time from when the prior call was received at the device, a flag is sent to the PSAP operator notifying the PSAP operator of the prior call. The PSAP operator can then inquire about the prior call. The caller is then allowed to electronically transfer location and identity information related to the prior call to the PSAP operator if they wish to do so.

The location information provided to the PSAP preferably comprises a geographic location of the prior caller, such as an address, a latitude, longitude, a city, or a PSAP jurisdiction. Identity information preferably comprises a name of the prior caller, a telephone number of the prior caller, or a relationship of the prior caller to the person currently calling the PSAP. It should be noted that both the location and the identity information comprises information of a past caller to the person currently calling the PSAP.

The location and identity information of the prior call that is provided by the device to the PSAP was received and stored by the device placing the call to the PSAP. This was accomplished during the past call by an application that is installed on the PSAP caller's phone.

After installing the application, when receiving calls, the location of the caller (if available) is identified and stored for a short or predetermined period (for example, kept for just five minutes). The caller ID information is also stored, and, if the caller is in the device's phone book, phone-book information for the caller is stored as well.

If the caller is in a close relationship with the called person, the caller may receive a prompt (for example, through SMS message) to install the same application (or a companion app) so that afterwards every time the caller places a call to the user, the application will determine the identity, relationship, and location information and send the information to the called party.

In another embodiment, the location information can be updated or synchronized periodically from the prior caller's device to the called-parties device, even after the prior call has been terminated so that the PSAP system would be receiving the latest or updated location information (for example, updated or live location of prior caller after the prior call has been terminated). In another embodiment, upon user approval, the prior call conversation audio would be stored inside the user's device so that it can also be sent to the PSAP together with the location information and identify information.

Expanding on the above, when a device receives a call, the location, identity, and possibly audio (or a transcript of audio) of the caller is stored locally for a predetermined period of time (e.g. for 5 minutes). After the predetermined period, the information is discarded. When the device calls a PSAP, the device will determine if there has been a recently received call (prior call). If there has been a prior call to the device within the predetermined period of time, the emergency PSAP operator is notified. The emergency PSAP operator can then ask the caller if the emergency is related to the prior call. The caller can then provide the stored information to the emergency PSAP operator. It should be noted that if multiple calls were received during the predetermined period of time, then only information relating to the last call will be provided to the PSAP operator.

The notification to the PSAP operator of the prior call to the device is provided by the device to the PSAP by sending a text, SMS, MMS or call metadata from the device to PSAP system which would also have access to the same application or service running on the device.

The data or information received by the PSAP system will be displayed to the PSAP operator, for example in a monitor display that contains the current 911 call information and respective dispatch user interface. In one example, if a prior call happens within a predetermined time before the current call, an indication or notification will be displayed to the PSAP operator on a graphical-user interface (GUI). The notification may simply comprise a popup notification, or any other visual and/or audio information that signifies that a recent call has been placed to the 911 caller prior to the 911 caller calling the PSAP.

Upon agreement, the emergency caller can feed the prior call information to the PSAP. This is preferably done with a single touch of a user interface on the running application. Automatic routing to the correct PSAP can then take place. More specifically, the prior caller's information is used to determine the right PSAP jurisdiction to transfer the emergency call.

As an example of the above, assume that Joe (who lives in Chicago) receives a call from Fred (who lives in Seattle). Fred is suicidal, and Joe feels that this should be reported to the authorities so Fred does not hurt himself. When Joe hangs up with Fred, Joe immediately dials 9-1-1 and gets connected to a PSAP in Chicago. The operator is given a notification that a prior call to Joe has been received prior to the PSAP call being placed, and requests information about the call. With a touch of a soft key (or other UI action), Joe electronically transfers the location and identity of Fred to the PSAP operator. The PSAP operator can then transfer the call to the right agency in Seattle based on this information.

In another example, the PSAP system will automatically route or transfer the call to the right agency (for example, the PSAP in Seattle in the prior example use case) without the need for the PSAP operator to take action for the transfer of the call.

Turning now to the drawings wherein like numerals designate like components, FIG. 1 shows operational environment 100 for the present invention. Environment 100 includes devices 112 and 113, PSAPs 114 and 115, network 106, and communication links 104.

Network 106 includes elements such as base stations, base station controllers (BSCs), routers, switches, and the like, arranged, connected, and programmed to provide wireless service to devices 112 and 113 (e.g., smart phones operated by users 120 and 121) in a manner known to those of skill in the relevant art.

Devices 112 and device 113 may be any suitable computing and communication devices configured to engage in wireless communication over an air interface as is known to those in the relevant art. Devices 112 and 113 are capable of running an application that configures devices 112 and 113 to temporarily store identity and/or location information for callers, and provides a flag (notification) to a PSAP when a prior call was received within a predetermined period of time. For example, devices 112 and 113 may comprise a mobile device running an Android™ or iOS™ operating system running an application to accomplish the above.

Finally, PSAPs 114 and 115 are part of a computer-aided-dispatch center, manned by an operator. PSAPs 114 and 115 typically comprises a graphical user interface that provides the dispatch operator necessary information about public-safety incidents and PSAP callers.

During operation, user 121 may place a call from device 113 to device 112 operated by user 120. As discussed, the call may comprise some sort of emergency that needs to be reported to a PSAP. Call information about device 113 is stored at device 112 regarding the call from device 113. As discussed, this call information comprises an identity of caller 121 (e.g., caller ID, phone number or simply taken from, for example, a phone book stored at device 112) and/or a location of device 113, and audio of the call. When placing a call from device 113 to device 112, device 113 will preferably provide a phone number and a location of device 113. In another example, the device 112 will also store the prior call conversation audio and/or prior call audio transcription in the device. This information will be temporarily stored at device 112.

After receiving the call from device 113, when device 112 places a call to the PSAP within the predetermined time period, a flag is sent to the PSAP operator. This flag may comprise a simple message from device 112 to the PSAP that a prior call was received within the predetermined period of time. The flag causes a notification to appear on a graphical-user interface (GUI) within the PSAP.

The PSAP operator can then inquire about the prior call and have user 120 send prior call information (e.g., the identity and/or location of user 121 and potential audio obtained from the prior call). This information may be provided by user 120 pressing a single button or user interface element to initiate a data transfer of the information from device 112 to the PSAP. The information is then displayed on the GUI at the PSAP for the operator to see.

The operator can then transfer the current call to another PSAP if necessary. For example, assume that user 121 is in the geographical location served by PSAP 114, and that user 120 is in the geographical location served by PSAP 115. When user 120 dials 911, they will be connected to PSAP 115. This call may then be transferred to PSAP 114 based on the identity of person 121 and location information of device 133 obtained from device 112.

Figure 2:
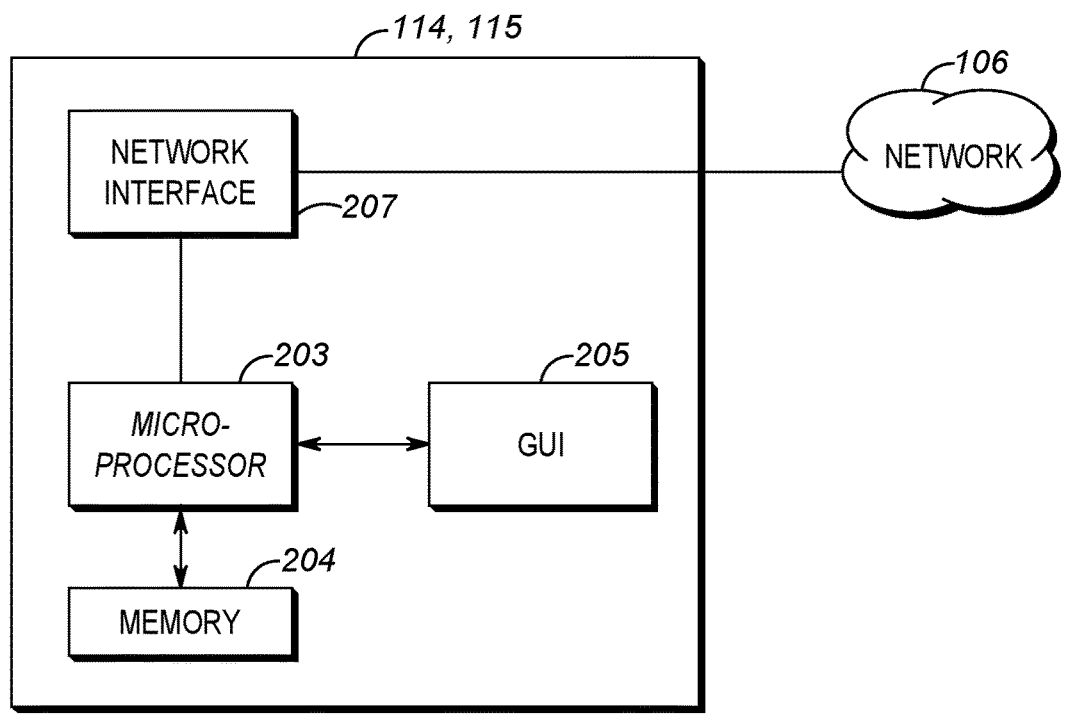
FIG. 2 is a block diagram of a public-safety answering point.

FIG. 2 is a block diagram of a PSAP. A PSAP, sometimes called "public-safety access point", comprises a call center where emergency calls (like police, fire brigade, ambulance) initiated by any mobile or landline subscriber are terminated. Typically, when an emergency number is dialed, logic is implemented by mobile or network operators to route the call to the nearest police station (or other facility), which serves as the PSAP. Trained PSAP operators are also usually responsible for taking the call and dispatching emergency services.

As shown, the PSAP may include network interface 207, graphical-user interface (GUI) 205, logic circuitry 203, and memory 304. In other implementations, the PSAP may include more, fewer, or different components.

Graphical-User Interface (GUI) 205 comprises a screen (e.g., a liquid crystal display (LCD), organic light-emitting diode (OLED) display, surface-conduction electro-emitter display (SED), plasma display, field emission display (FED), bistable display, projection display, laser projection, holographic display, etc.) that can display images, maps, incident data, . . . , etc. GUI 205 displays information about emergency calls. This information may comprise a flag, or notification, that a prior call was received by a caller within a predetermined period of time before the caller placed the current call to the PSAP. The information may also comprise an identity and a location of the prior call made to the individual currently placing the call to the PSAP. In order to provide the above features (and additional features), GUI 205 may include a monitor, a keyboard, a mouse, and/or various other hardware components to provide a man/machine interface.

Logic circuitry 203 comprises a digital signal processor (DSP), general purpose microprocessor, a programmable logic device, or application specific integrated circuit (ASIC) and is utilized to run software necessary to execute the instructions/steps to receive and display information about a prior call made to a current PSAP caller. The software may be stored in memory 204.

In an illustrative embodiment, network 106 is attached (i.e., connected) to the PSAP through network interface 207 and communicates with processor 203. Network 106 is connected via a wired connection to network interface 207, although this connection may be wireless in alternate embodiments. Network interface 207 includes elements including processing, modulating, and transceiver elements that are operable in accordance with any one or more standard or proprietary wired or wireless interfaces, wherein some of the functionality of the processing, modulating, and transceiver elements may be performed by means of processor 203.

As described above FIG. 2 comprises an apparatus comprising a network interface 207 configured to receive an emergency call from a first device, wherein the first device is operated by a first person, the network interface also configured to receive an electronic indication along with the emergency call, the electronic indication indicating that a prior call was made to the first device from a second device within a predetermined period of time, wherein the second device is operated by a second person, the network interface also configured to receive an identity of the second person and/or electronic location data for the second person, from the first device, based on the prior call made by the second person to the first person. A graphical user interface 205 is provided and configured to display a message or prompt on a graphical-user interface that the prior call was made to the first device from the second device within the predetermined period of time.

As discussed above, the electronic indication that the prior call was made to the first device from the second device within the predetermined period of time comprises an electronic flag (or notification) from the first device that the prior call was made to the first device from the second device within the predetermined period of time.

Additionally, the electronic location data comprises geographic coordinates of the second person at the time the prior call was made.

Logic circuitry is also provided in FIG. 2 and configured to send routing instructions to transfer the emergency call to a second dispatch operator based on the electronic location data of the second person.

It should be noted that the network interface can also be configured to receive prior call audio data from the first device and wherein the logic circuitry is also configured to transcribe the prior call audio data, and the graphical-user interface is configured to display the prior call audio transcription.

Figure 3:
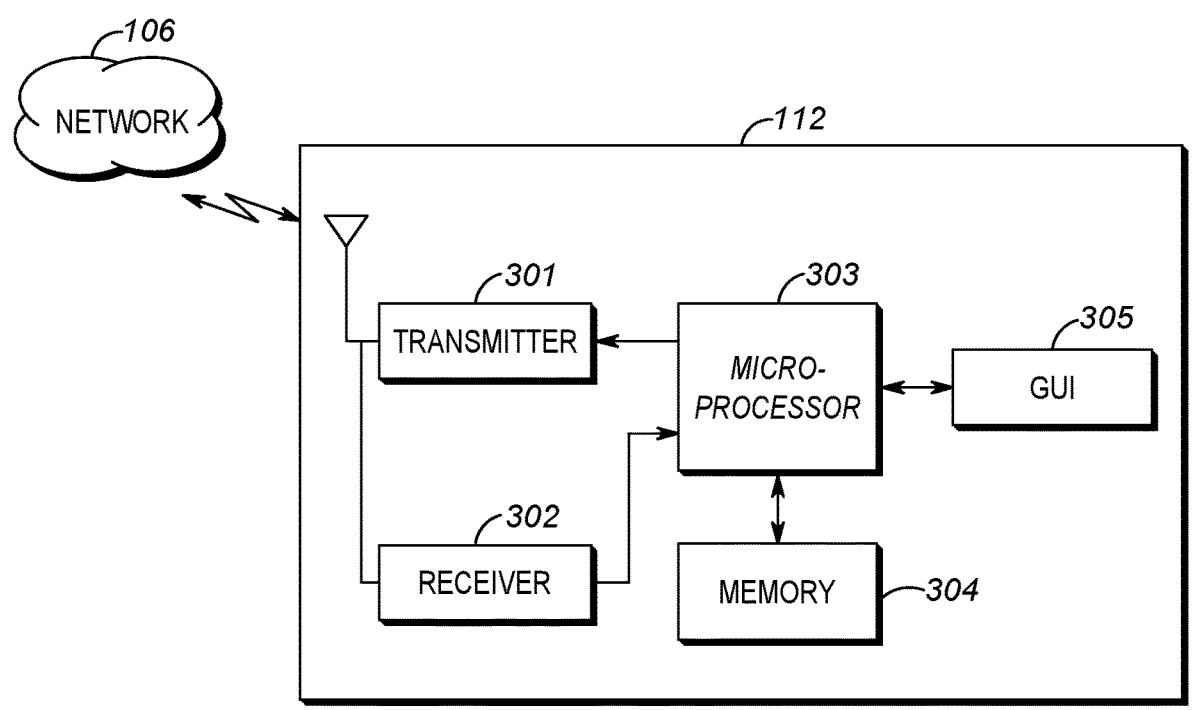
FIG. 3 is a block diagram of a device used to call a public-safety answering point.

FIG. 3 is a block diagram of user device 112. As shown, device 112 comprises GUI 305, database 304, logic circuitry 303, transmitter 301, and receiver 302. The components shown in device 112 are similar to those described above with reference to FIG. 2, except for the addition of transmitter 301 and receiver 302. Transmitter 301 and receiver 302 are preferably wireless, and may be long-range and/or short-range transceivers that utilize a private 802.11 network set up by a building operator, a next-generation cellular communications network operated by a cellular service provider, or any other network capable of voice and data transmissions.

During operation, logic circuitry 303 runs an application from memory 304 that configures device 112 to store information related to received calls. This information preferably comprises an identity and a location of the received call, but may comprise other information as well. This information is stored in memory 304 for a predetermined period of time after the call is terminated.

When a user contacts a PSAP within the predetermined time period after a prior call was terminated, a notification is sent via transmitter 301 through network 106, and to the PSAP. As discussed above, this notification causes the GUI at the PSAP to display an indication that the prior call was received by the PSAP caller within the predetermined period of time.

Figure 4:
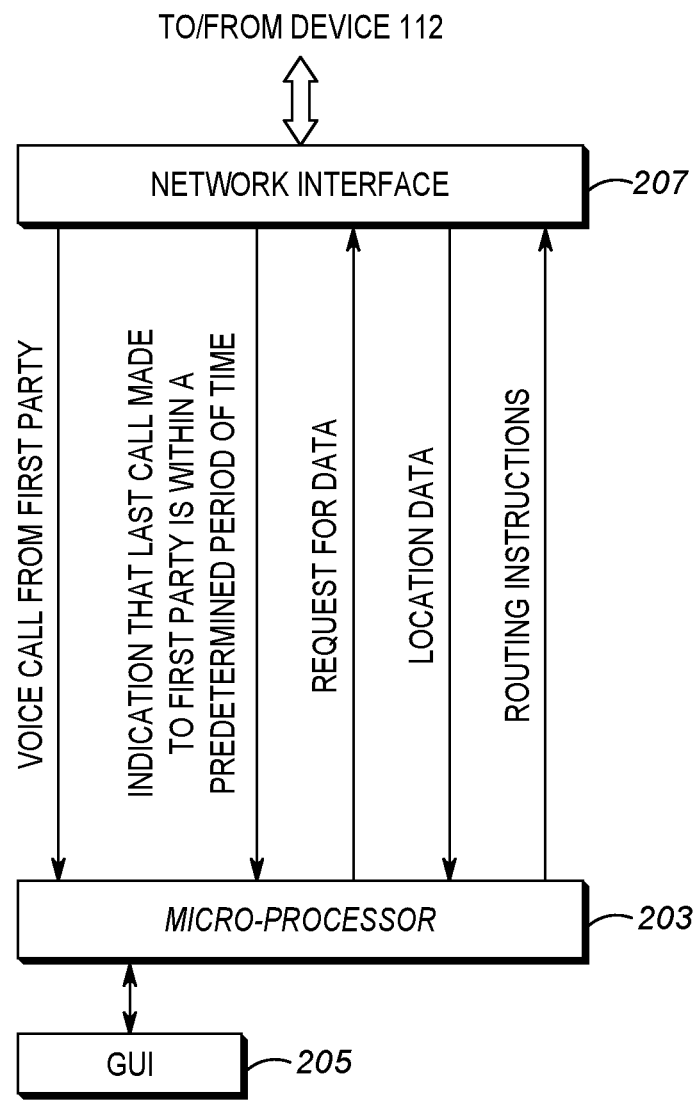
FIG. 4 illustrates communications between a PSAP caller device and a public-safety answering point.

FIG. 4 illustrates communications between a PSAP caller device and a public-safety answering point. As illustrated, a voice call from a first party is received at the network interface and passed to logic circuitry 203. Along with the call is an indication that a last call received by the first party was within a predetermined period of time. This indication may simply be a short data message several bits long that comprises a flag that the prior call was received. In response to this indication being received, logic circuitry 203 causes a message/flag/popup to be displayed at GUI 205 indicating that the call was received by the PSAP caller within the predetermined period of time.

The PSAP operator can then request data on the prior caller. This data preferably comprises location data. In response to receiving the data, routing instructions may be provided by logic circuitry 203 to network 106 automatically route the current PSAP call to another PSAP.

In another example where prior call audio and or audio transcription is also sent to the PSAP, the current emergency call audio would also be transcribed and provided to the PSAP operator. In this embodiment, the prior call transcription or transcription summary can be displayed to the PSAP operator.

Figure 5:
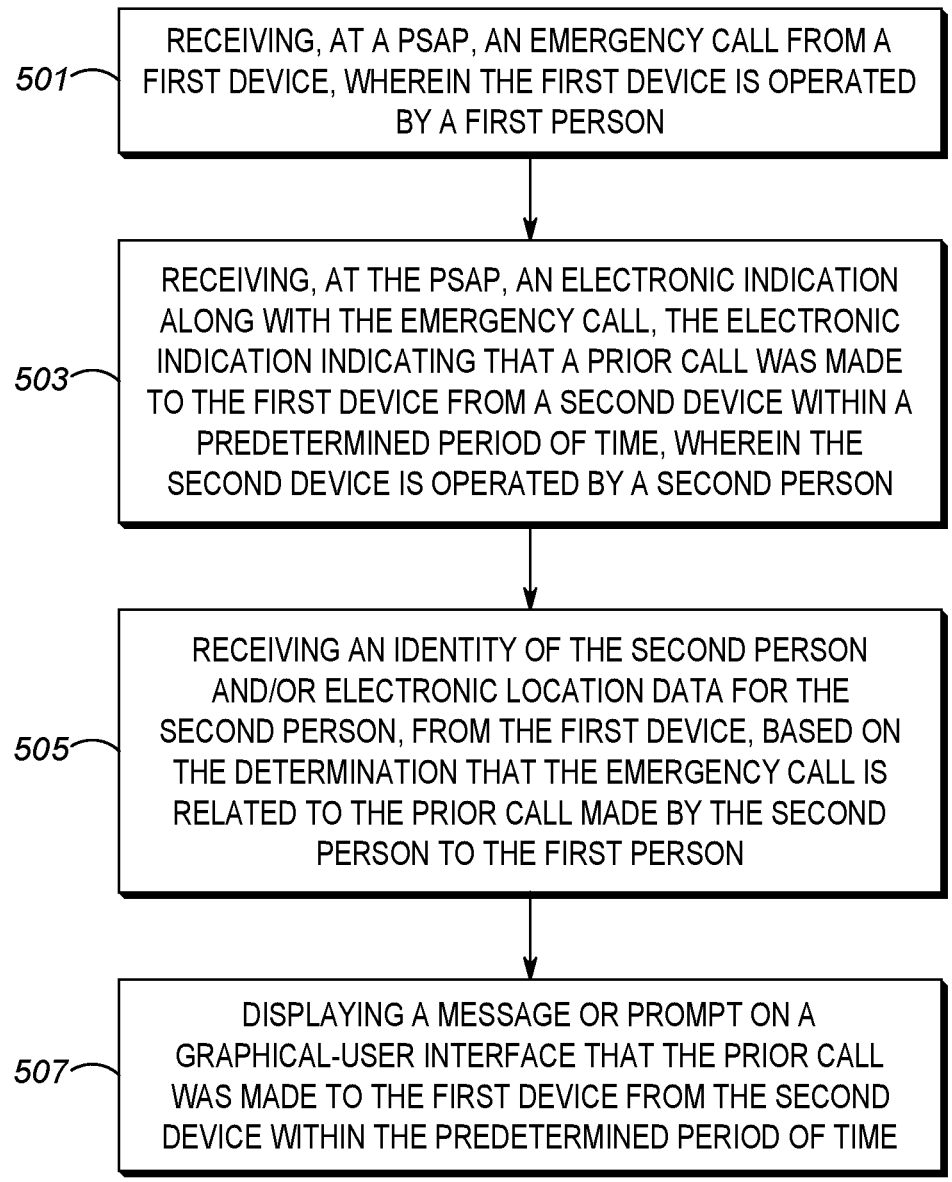
FIG. 5 is a flow chart showing operation of the public-safety answering point of FIG. 2.

FIG. 5 is a flow chart showing operation of the PSAP of FIG. 2. The logic flow begins at step 501 where an emergency call is received from a first device at a PSAP network interface, wherein the first device is operated by a first person.

At step 503 an electronic indication is received at the PSAP network interface along with the emergency call, the electronic indication indicating that a prior call was made to the first device from a second device within a predetermined period of time, wherein the second device is operated by a second person.

At step 505, identity information of the second person and/or electronic location data for the second person, is received at the PSAP network interface from the first device, based on prior call made by the second person to the first person.

Finally, at step 507, a message or prompt is displayed on a graphical-user interface that the prior call was made to the first device from the second device within the predetermined period of time.

As discussed above, the step of receiving the electronic indication that the prior call was made to the first device from the second device within the predetermined period of time comprises the step of receiving an electronic flag from the first device that the prior call was made to the first device from the second device within the predetermined period of time.

Additionally, the electronic location data may comprise geographic coordinates of the second person at the time the prior call was made.

As discussed above, routing instructions may be provided to a network to transfer the emergency call to a second dispatch operator based on the electronic location data of the second person.

Finally, prior call audio data may be received from the first device at the network interface transcribing the prior call audio data and displaying the prior call audio transcription on a graphical-user interface.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for receiving prior-call information from an emergency call, the method comprising the steps of:
   receiving, at a PSAP, an emergency call from a first device, wherein the first device is operated by a first person;
   receiving, at the PSAP, an electronic indication along with the emergency call, the electronic indication indicating that a prior call was made to the first device from a second device within a predetermined period of time, wherein the second device is operated by a second person;
   receiving an identity of the second person and/or electronic location data for the second person, from the first device, based on the prior call being made by the second person to the first person; and displaying a message or prompt on a graphical-user interface that the prior call was made to the first device from the second device within the predetermined period of time.

2. The method of claim 1 wherein the step of receiving the electronic indication that the prior call was made to the first device from the second device within the predetermined period of time comprises the step of receiving an electronic flag from the first device that the prior call was made to the first device from the second device within the predetermined period of time.

3. The method of claim 1 wherein the electronic location data comprises geographic coordinates of the second person at the time the prior call was made.

4. The method of claim 1 further comprising the step of:
sending routing instructions to transfer the emergency call to a second dispatch operator based on the electronic location data of the second person.

5. The method of claim 1 further comprising the step of:
receiving prior call audio data from the first device;
transcribing the prior call audio data; and
displaying the prior call audio transcription on a graphical-user interface.

6. A method for receiving prior-call information from an emergency call, the method comprising the steps of:
receiving, at a PSAP, an emergency call from a first device, wherein the first device is operated by a first person;
receiving, at the PSAP, an electronic indication along with the emergency call, the electronic indication indicating that a prior call was made to the first device from a second device within a predetermined period of time, wherein the second device is operated by a second person;
receiving an identity of the second person and audio data for the prior call from the first device, based on the prior call made by the second person to the first person;
wherein the step of receiving the electronic indication that the prior call was made to the first device from the second device within the predetermined period of time comprises the steps of:
receiving an electronic flag from the first device that the prior call was made to the first device from the second device within the predetermined period of time; and
displaying a message or prompt on a graphical-user interface that the prior call was made to the first device from the second device within the predetermined period of time.

7. An apparatus comprising:
a network interface configured to receive an emergency call from a first device, wherein the first device is operated by a first person, the network interface also configured to receive an electronic indication along with the emergency call, the electronic indication indicating that a prior call was made to the first device from a second device within a predetermined period of time, wherein the second device is operated by a second person, the network interface also configured to receive an identity of the second person and/or electronic location data for the second person, from the first device, based on the prior call made by the second person to the first person; and
a graphical user interface configured to display a message or prompt on a graphical-user interface that the prior call was made to the first device from the second device within the predetermined period of time.

8. The apparatus of claim 7 wherein the electronic indication that the prior call was made to the first device from the second device within the predetermined period of time comprises an electronic flag from the first device that the prior call was made to the first device from the second device within the predetermined period of time.

9. The apparatus of claim 7 wherein the electronic location data comprises geographic coordinates of the second person at the time the prior call was made.

10. The apparatus of claim 7 further comprising:
logic circuitry configured to send routing instructions to transfer the emergency call to a second dispatch operator based on the electronic location data of the second person.

11. The apparatus of claim 7 wherein the network interface is also configured to receive prior call audio data from the first device and wherein logic circuitry is provided and configured to transcribe the prior call audio data, and the graphical-user interface is configured to display the prior call audio transcription.

* * * * *